United States Patent [19]
Hensel

[11] 3,719,994
[45] March 13, 1973

[54] APPARATUS FOR DRAINING WHEY FROM CHEESE

[76] Inventor: Otis O. Hensel, P. O. Box 185, Hustisford, Wis. 53034

[22] Filed: April 2, 1971

[21] Appl. No.: 130,669

[52] U.S. Cl. .............................. 31/46, 99/243, 31/48
[51] Int. Cl. ............................................... A01j 25/11
[58] Field of Search .................. 31/46, 47, 48; 99/243

[56] References Cited

UNITED STATES PATENTS

| | | | |
|---|---|---|---|
| 3,355,805 | 12/1967 | Krueger et al. | 31/46 |
| 3,568,316 | 3/1971 | Hensel | 31/48 |
| 3,609,866 | 10/1971 | Dejonge | 31/48 |

Primary Examiner—Aldrich F. Medbery
Attorney—Andrus, Sceales, Starke & Sawall

[57] ABSTRACT

An apparatus for pressing and draining whey from cheese curd. The cheese curd to be treated is contained within a box or container having a generally rectangular cross-section and an open top. The box is mounted within a supporting frame and a perforated lid is connected to the side portions of the frame structure and encloses the open top of the box. The frame containing the box is lifted into a supporting cradle that is adapted to travel on an overhead rail extending within the cheese making plant. The cradle includes an outer cradle member suspended from the rail and an inner cradle member which supports the frame and box. The inner cradle member is pivotally connected to the outer member about a horizontal axis so that the box can be tilted to a downwardly inclined position to permit the whey to drain from the cheese curd through the perforated lid. A locking mechanism is included to lock the box in the upright, as well as in the downwardly inclined position. To permit the box to be rotated about its longitudinal axis, an axial pin connected to the lid is journalled within a cross bar on the inner cradle member and the base of the inner cradle member is provided with an upstanding pin which is received within an opening in the base of the frame.

10 Claims, 8 Drawing Figures

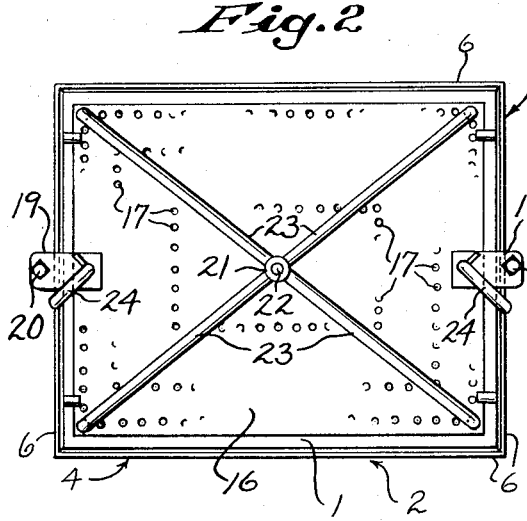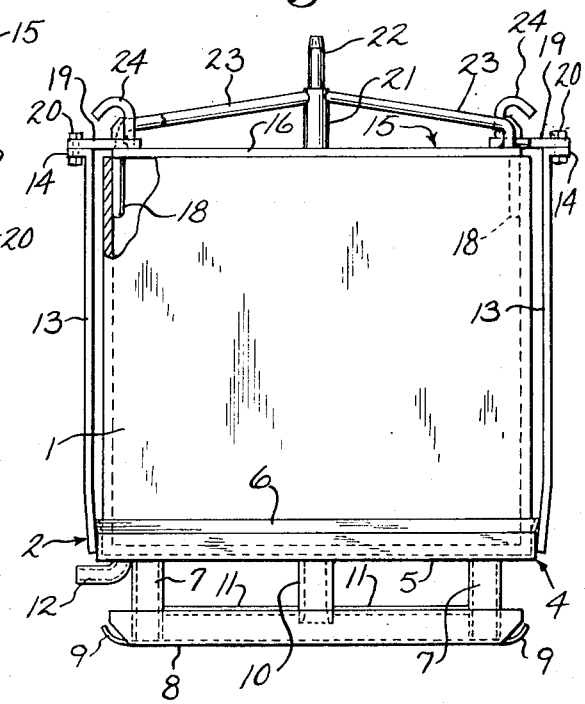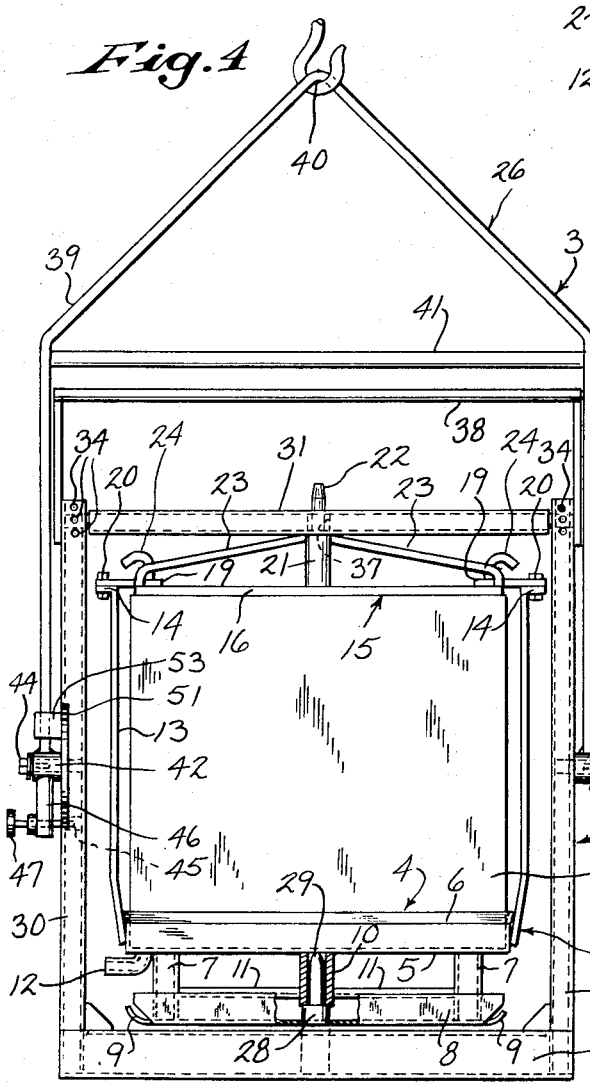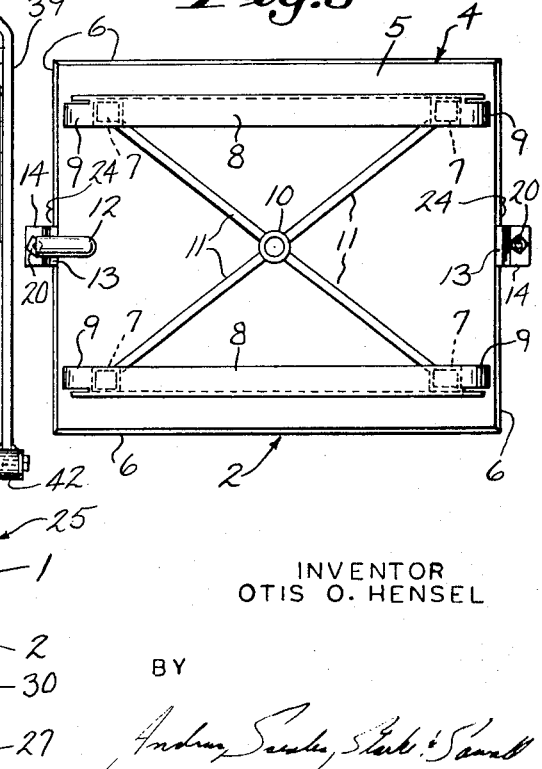
INVENTOR
OTIS O. HENSEL

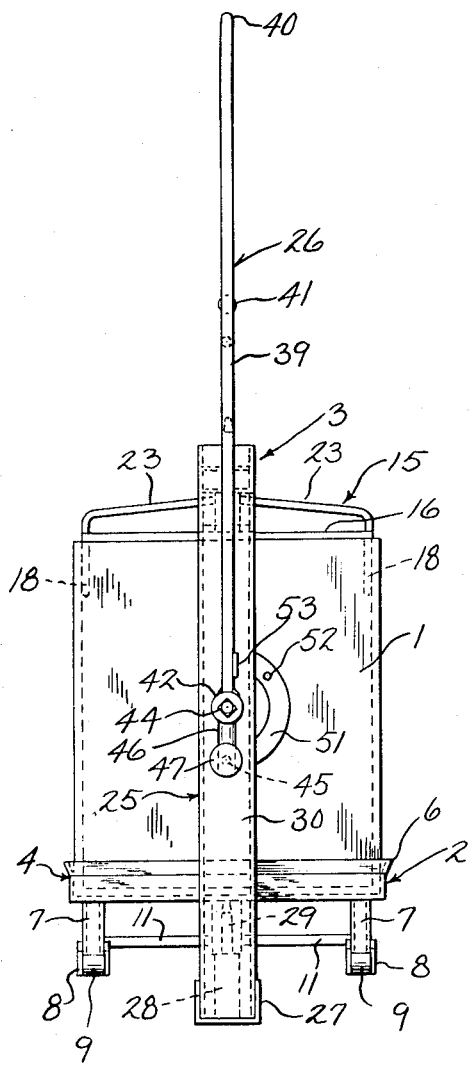
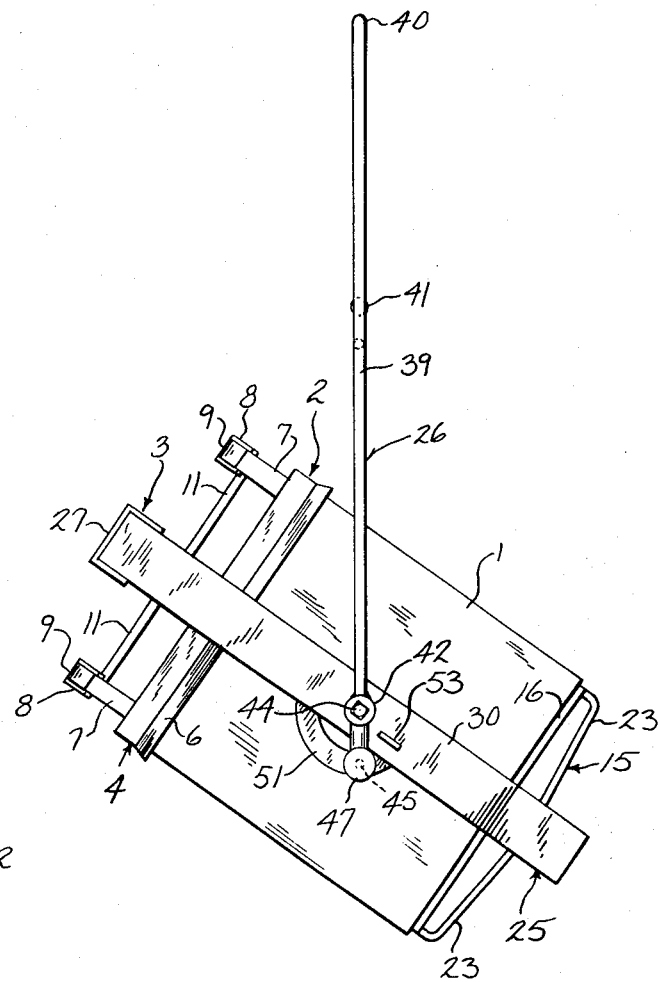
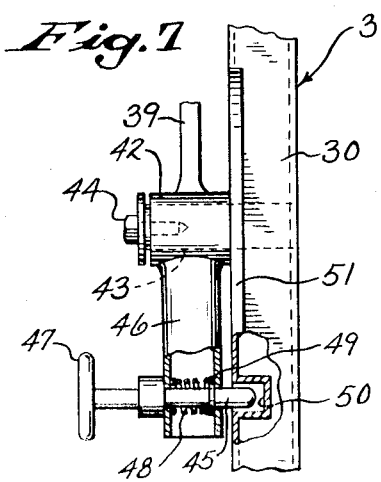
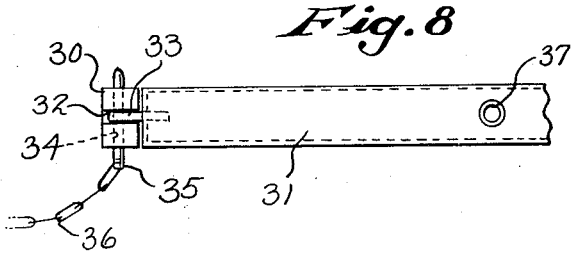
INVENTOR
OTIS O. HENSEL
ATTORNEYS

APPARATUS FOR DRAINING WHEY FROM CHEESE

BACKGROUND OF THE INVENTION

In the conventional cheese making process for preparing cheddar and colby cheese, the cheese curd is removed from the cheese making vat and placed in an open-topped barrel or container. Normally a sleeve is placed in the open end of the container and the cheese is filled to a level about 6 inches from the top of the container. In the conventional process a pipe is then inserted within the mass of cheese curd within the container and a vacuum is drawn to remove residual whey from the curd. The cheese curd is then pressed into the container either by mechanical or hydraulic pressing equipment, or by placing a lid on the cheese curd and weighting the lid.

Due to the fact that a considerable quantity of cheese curd, in the range of 500 to 800 pounds, is contained within the barrel or container, the automatic pressing equipment used to compress the cheese curd is relatively complicated and expensive. The use of weights is less expensive than automatic pressing equipment, but the weights are sizable and weigh about 100 pounds apiece, so that they not only occupy considerable storage space, but it requires substantial manual labor to apply the weights to the lid and subsequently remove the weights.

The pending application Ser. No. 792,599, filed Jan. 21, 1969, now U.S. Pat. No. 3,568,316, describes an improved apparatus for pressing and draining the residual whey from cheese curd. According to the invention of the aforementioned patent application, the curd is pressed within a barrel and a perforated lid is attached to the open end of the barrel. The barrel is then mounted in a cradle which is supported from an overhead rail or track. The cradle includes an outer member which is mounted for movement on the rail, and an inner member is pivotally connected to the outer member and supports the barrel. By pivoting the inner member with respect to the outer member, the barrel can be tilted to a downwardly inclined position to permit the residual whey to drain from the cheese curd through the perforated lid. While in the downwardly inclined position, the barrel can be rotated about its axis.

With the apparatus of the aforementioned patent application, the weight of the cheese curd itself is utilized to remove the residual whey, thereby eliminating the need for conventional pressing equipment, or auxilliary weights.

SUMMARY OF THE INVENTION

The present invention is directed to an apparatus for pressing and draining whey from cheese curd and is an improvement to the apparatus described in United States patent application Ser. No. 792,599, filed Jan. 21, 1969, now U.S. Pat. No. 3,568,316. According to the invention, the cheese curd is pressed within a box having a generally rectangular cross section and the box is placed within a frame that includes a base supported by skids to enable the frame to be readily transported over the ground. The frame also includes a perforated lid which encloses the upper open end of the box.

The frame containing the box is lifted by a hoist unit into a supporting cradle which is suspended from an overhead rail or track. The cradle includes an outer member which is mounted for movement on the rail, and an inner member is pivotally connected to the outer cradle member about a horizontal axis so that the box can be tilted to a downwardly inclined position to permit the residual whey to drain from the cheese curd through the perforated lid.

To lock the box in the downwardly inclined position a locking mechanism is provided which locks the inner cradle member with respect to the outer cradle member.

When in the downwardly inclined position, the box can be rotated about its longitudinal axis and to facilitate this rotation a pin extends outwardly from the lid and is journalled within a cross bar on the inner cradle member. In addition, the base portion of the inner cradle member is provided with a pin or shaft which is received within an opening in the base of the frame.

In operation, the cheese curd is introduced into the box and pressed therein. The box is then lifted into the frame and the lid is engaged to enclose the upper open end of the box. The frame containing the box of cheese curd is then mounted in the inner cradle member and the cradle is then moved along the rail to a drainage area. By tilting the inner cradle member with respect to the outer cradle member the box can be tilted to a downwardly inclined position whereat the axis of the box is located at an angle of 5° to 50° with respect to the horizontal. In this inclined position, the residual whey will drain from the cheese curd into a drainage trough. During the period of time when the box is in the inclined position the barrel is intermittently rotated about its axis. Subsequently, the box is returned to the upright position and the cradle containing the upright box is then moved along the rail to an unloading position.

The apparatus of the invention is a simple and inexpensive unit which enables the residual whey to be drained from the curd. The weight of the curd itself is employed to matt and compress the cheese curd so that the invention eliminates the need for conventional pressing equipment, or the need of auxilliary weights.

The apparatus of the invention is particularly adapted for use with large generally rectangular boxes which can contain up to 700 to 800 pounds of cheese curd.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the box containing cheese curd supported by the frame;

FIG. 2 is a top view of the structure shown in FIG. 1;

FIG. 3 is a bottom view of the structure shown in FIG. 1;

FIG. 4 is a front elevation showing the frame and box mounted in the cradle;

FIG. 5 is a side elevation of the structure shown in FIG. 3;

FIG. 6 is a view similar to FIG. 5, showing the box in the downwardly inclined position;

FIG. 7 is an enlarged fragmentary elevation showing the locking mechanism; and

FIG. 8 is a top plan view of the upper cross bar of the inner cradle member.

DESCRIPTION OF THE PREFERRED EMBODIMENT

The drawings illustrate an apparatus for pressing and draining whey from cheese curd which comprises, in general, a box 1 to contain the cheese curd and is supported in a frame 2 which in turn is mounted within a cradle 3.

The box 1 is generally rectangular in cross section and is normally fabricated from plywood and contains a polyethylene liner to receive the cheese curd.

The frame 2 includes a supporting base 4 composed of a generally flat plate 5 and an upstanding peripheral flange 6. The plate 5 has a shape which correspond to the cross-sectional shape of the box, so that the box 1 will be supported on the plate 5 and the flange 6 will prevent displacement of the box.

A series of legs 7 extend downwardly from the plate 5 and each corresponding pair of legs is connected to a skid 8. The skids 8 are provided with curved ends 9 which enable the frame to be transported over the ground.

Located centrally of the base plate 5 is a sleeve 10 which extends downwardly from the plate and is supported by a series of rods or braces 11 that are connected between the sleeve and the legs 7.

Residual whey which may leak from the box 1 mounted on the plate 5 can be drained from the base through a drain conduit 12. The drain conduit can be closed off, as desired by a plug, not shown.

Extending upwardly from opposite sides of the base 4 are a pair of vertical support bars 13, each of which terminates in an outwardly extending flange 14.

The open end of the box 1 which is supported on the base 4 is adapted to be enclosed by a perforated lid 15. As best illustrated in FIG. 2, the lid 15 consists of a flat plate 16 having a series of holes 17 therein through which the whey can drain when the box 1 is inverted.

To align the lid 15 with respect to the box 1, positioning rods 18 are secured to the four corners of the lid plate 16 and extend downwardly. The rods 18 are adapted to be received in the four corners of the box 1 to thereby position the lid plate with respect to the box.

To attach the lid 15 to the support bars 13, lugs 19 extend outwardly from the lid plate 16 and are adapted to be positioned over the flanges 14 of the supports 13. Bolts 20 connect the bars 19 to the flanges 14 to thereby secure the lid to the supports 13.

Located centrally of the lid plate 16 is a vertical rod 21 which terminates in a tapered pin 22. Reinforcement is provided for the rod by a series of braces 23 which are connected between the rod 21 and the four corners of the lid plate 16.

To elevate the frame 2 containing the box 1 into the cradle 3, as will be hereinafter described, a pair of hooks 24 are secured to the lid plate 16 and are adapted to be engaged by a hoist or other lifting mechanism.

The cradle 3 includes an inner cradle member 25 which supports the frame 2 carrying the box 1, and an outer cradle member 26. The inner cradle member 25 is composed of a base 27 and a rod 28 is secured centrally of the length of the base and terminates in a tapered pin 29 which is adapted to be received within the sleeve 10 in the base 4 of the frame 2. A pair of side members 30 extend upwardly from the ends of the base 27 and a cross member 31 is connected between the upper ends of the side members. To provide an adjustment for the connection of the cross bar 31 to the side members 30, the upper end of each side member is provided with a vertical slot 32 which receives the flattened end 33 of the crossbar 31. The upper end of each side member is provided with a series of holes 34 and similarly each flattened end 33 is provided with a hole that can be brought into alignment with one of the holes 34 in the side member. Locking pins 35 attached by chains 36 to the side members can be inserted within the aligned holes to lock the cross bar to the side members.

The central portion of the cross bar 31 is provided with a bushing 37 which receives the upstanding pin 22 on lid 15. With this construction both the upper and lower ends of the frame 22, which supports the box 1 of cheese curd, is journalled with respect to the inner cradle member 25.

A generally U-shaped support or brace 38 is connected between the upper ends of the side members 30 to prevent spreading of the side members.

The outer cradle member 26 includes a pair of side rods 39, the upper ends of which converge and are joined at apex 40. A hoist or other lifting member mounted for movement on a rail is adapted to engage the outer cradle member at the apex 40 to thereby transport the box 1 to a drainage area.

The upper portions of the side rods 39 are connected together by a cross rod 41.

To journal the outer cradle member with respect to the inner cradle member 25, the lower ends of the side rods 39 are welded to sleeves 42 which are journalled around shafts 43 that extend outwardly from the respective side members 30 of the inner cradle member 25. Bolts 44 are threaded on the outer ends of the shafts 43 to prevent displacement of the sleeves 42 from the respective shafts. By pivoting the inner cradle member 25 with respect to the outer cradle member 26, the box 1 can be pivoted from the upright position to a downwardly inclined position as shown in FIG. 6 to thereby permit the residual whey to drain from the cheese curd through the openings 17 in the lid 15.

To lock the box in both the upright and the downwardly inclined position, a locking pin 45 is mounted for movement within a tube 46 attached to one of the sleeves 42. The outer end of the pin is provided with an enlarged head 47, and a spring 48 is located around the pin 45 and within the tube 46 and acts against a split pin 49 connected to pin 45 to thereby urge the locking pin 45 inwardly so that the inner end of the locking pin will be urged into engagement with a hole 50 formed in the side member 30 of the inner cradle member. The engagement of the locking pin 45 with the hole 50 will lock the box 1 in the upright position. To lock the box in the downwardly inclined position, a curved plate 51 is secured to the side member 30 and is provided with a hole 52. When the inner cradle member 25 is pivoted to an angle of about 35°, the locking pin 45 can be inserted within the hole 52 to lock the inner cradle member and box 1 in the downwardly inclined position.

A stop 53 is secured to the inner cradle member 25 so that the inner cradle member can be pivoted only in one direction with respect to the outer cradle member.

In operation, the box 1 is mounted on the base 4 of the frame 2. The cheese curd is then introduced into the box and pressed therein. The lid 15 is clamped to the frame by the bolts 20 to enclose the open top of the box.

With the lid 15 attached, the frame 2 is then lifted by a hoist engaged with the hooks 24 and lowered within the inner cradle member until the pin 29 of the inner cradle member is received within the sleeve 10 of the frame.

After disengagement of the hoist, the pin 22 on the lid 15 is engaged within the bushing 37 in the cross bar 31 and the cross bar is then locked to the side members 30 by insertion of the pins 35 within the aligned holes 34.

With the box 1 and the supporting frame 2 locked to the inner cradle member 25, the cradle is then moved along a track to a position above a drainage trough. The locking pin 45 is then disengaged from the hole 50 in the side member 30 of the inner cradle member, and the inner cradle member as well as the frame 2 and the box 1 are then pivoted or tilted so that the box is in a downwardly inclined position, as shown in FIG. 6. The locking pin 45 is then inserted within the hole 52 to lock the box at this downwardly inclined attitude, with the lid 15 being located at the lower end of the inclined box.

The residual whey contained within the cheese curd will then drain toward the low end of the box and be discharged through the holes 17 in lid 15 to the drainage area.

The angle of incline is maintained within the limits of 5° to 50° to the horizontal and preferably in the range of about 35°. This limit of angularity provides adequate drainage of the whey as well as providing the proper matting or compression of the cheese curd within the box.

Every 15 minutes while the box is in the inclined position, the box is rotated approximately 90° about its longitudinal axis and maintained in this position for an additional 15 minute period. This procedure is repeated for a total period of 1 hour. At the end of the 1 hour period, the locking pin 45 is disengaged from the hole 52 and the box is righted to an upright position and the locking pin 45 engaged with the hole 50. The cradle 3 can then be moved along the track to an unloading station where the box 1 and frame 2 can be unloaded from the cradle by a hoist.

The invention provides a simple and inexpensive apparatus for draining the residual whey from the cheese curd and also aids in matting or compressing the cheese curd within the box. The apparatus eliminates the more expensive and complicated automatic pressing equipment and similarly eliminates the need for auxiliary weights used in other conventional methods.

Various modes of carrying out the invention are contemplated as being within the scope of the following claims particularly pointing out and distinctly claiming the subject matter which is regarded as the invention.

I claim:

1. An apparatus for draining whey from cheese curd, comprising an open-top container to contain the cheese curd, a frame to support the container and including a base, a removable lid to enclose the open top of the container and having an opening therein, means for removably securing the lid to the frame, a cradle including a first cradle member and a second cradle member to support the frame, first journalling means for journalling the base of the frame with respect to said second cradle member, second journalling means for journalling the lid with respect to said second cradle member, said first and second journalling means being in substantial vertical alignment when the frame and the container are in a generally upright position, and means pivotally connecting the second cradle member to the first cradle member for moving the frame and the container from a generally upright position to an inclined position, the whey draining by gravity from the cheese curd and being discharged through said opening in the lid when the container is in the inclined position.

2. The apparatus of claim 1, wherein said frame includes a pair of side members extending upwardly from the base in diametrically opposed relation, said lid being connected to the upper ends of said side members.

3. The apparatus of claim 1, wherein said lid is provided with a series of spaced openings.

4. The apparatus of claim 1, wherein said base comprises a plate to support the container, a peripheral flange extending upwardly from the base, and drain means connected to the plate.

5. The apparatus of claim 1, and including support means attached to the base and extending downwardly to a level beneath said first journalling means for supporting the frame in an upright position when the frame is removed from said cradle.

6. The apparatus of claim 5, wherein said support means is disposed out of contact with the second cradle member when the frame is supported by said second cradle member whereby the weight of said frame and said container, when the frame and container are in the upright position, is supported solely by said journalling means.

7. The apparatus of claim 1, wherein said first journalling means is located centrally of said base and the weight of the frame and the container is supported solely by said first journalling means when the frame and the container are in said upright position.

8. An apparatus for draining whey from cheese curd, comprising an open-top container to contain the cheese curd, said container having a generally rectangular cross section, a frame to support the container and including a base, said base including a support member to support the container and having a first bushing located generally centrally on said support member, a removable lid to enclose the open top of the container and having a plurality of openings therein, means for removably securing the lid to the frame, a cradle including a first cradle member and a second cradle member to support the frame, said second cradle member including a base member, an upstanding pin on said base member and disposed to be received in said first bushing to journal the lower portion of said frame with respect to said second cradle member, said second cradle member also including an upper member, a second bushing in said upper member, an upstanding pin on the lid and disposed to be received in said second bushing to journal the upper portion of said frame with respect to said second cradle member, means pivotally connecting the second cradle member to the first cradle member for moving the frame and the container from a generally upright position to an inclined position, the whey draining by gravity from the cheese curd and being discharged through said openings in the lid when the container is in the inclined position.

9. The apparatus of claim 8, and including a series of legs extending downward from said support member, and skid means connected to said legs, said skid means facilitiating movement of said frame over the ground.

10. The apparatus of claim 8, and including locking means for locking the container in the upright position and for locking the container in the inclined position.

* * * * *